United States Patent [19]
Wieder et al.

[11] Patent Number: 5,567,784
[45] Date of Patent: Oct. 22, 1996

[54] PROCESS FOR PRODUCING DIENE RUBBERS POLYMERIZED BY MEANS OF ND CATALYSTS AND EXHIBITING REDUCED COLD FLOW AND LOW INTRINSIC ODOR

[75] Inventors: Wolfgang Wieder, Leverkusen; Dieter Kuhlmann, Pulheim; Wolfgang Nentwig, Bergisch Gladbach, all of Germany

[73] Assignee: Bayer AG, Leverkusen, Germany

[21] Appl. No.: 530,625

[22] Filed: Sep. 20, 1995

[30] Foreign Application Priority Data

Oct. 10, 1994 [DE] Germany .................. 44 36 059.2

[51] Int. Cl.$^6$ ..................................... C08C 2/00
[52] U.S. Cl. ................. 526/164; 526/153; 526/172; 528/487; 528/501
[58] Field of Search ................. 526/153, 164, 526/172; 528/487, 501

[56] References Cited

U.S. PATENT DOCUMENTS

| | | | |
|---|---|---|---|
| 4,990,573 | 2/1991 | Andreussi et al. | 526/164 X |
| 5,428,119 | 6/1995 | Knauf et al. | 526/164 X |

FOREIGN PATENT DOCUMENTS 0201962  11/1986  European Pat. Off. .......... 526/164

Primary Examiner—Fred Teskin
Attorney, Agent, or Firm—Connolly & Hutz

[57] ABSTRACT

The production of diene rubbers polymerized by means of Nd catalysts and having reduced cold flow and low intrinsic odor is effected by the polymerization of diolefines adiabatically at temperatures of −20° to 150° C. in the presence of inert organic solvents and in the presence of metalloorganic mixed catalysts based on neodymium carboxylate, by subsequently depressurizing the reaction mixture obtained in this manner by reducing the pressure, and by treating the reaction mixture thereafter with disulphur dichloride, sulphur dichloride and/or thionyl chloride.

3 Claims, No Drawings

PROCESS FOR PRODUCING DIENE RUBBERS POLYMERIZED BY MEANS OF ND CATALYSTS AND EXHIBITING REDUCED COLD FLOW AND LOW INTRINSIC ODOR

This invention relates to a process for producing diene rubbers polymerised by means of Nd catalysts and exhibiting reduced cold flow and low intrinsic odour.

The production of polydienes based on Ziegler-Natta catalysts, e.g. cis-polybutadiene (BR), is a process which has long been used industrially on a large scale. It produces commercial quality Ti-BR, Co-BR, Ni-BR and Nd-BR, depending on the catalyst metal used. The products and the process have various specific advantages and disadvantages. Thus in some procession processes the polymerisation temperatures have to be kept low by cooling (isothermal mode of operation) in order to suppress unwanted side reactions which would result in gel formation in the reactors or in a deterioration of the properties of the product. Processes such as these are energetically less favourable than polymerisation processes which are carried out adiabatically, in which the heat of polymerisation which is released is utilised for heating the polymerisation solution.

European Patent Application 0 011 184 describes metallo-organic mixed catalysts based on neodymium carboxylates which can be used in a particularly suitable manner for the solution polymerisation of conjugated dienes. The polydienes produced according to European Patent Application 0 011 184; particularly polybutadiene, have a very favourable range of properties. However, one disadvantage of the polymerisation of dienes using the said catalysts is that the polymers exhibit relatively high cold flow, which can lead to problems during storage and transport. It is known that the catalytic effect of neodymium catalysts can be modified by preforming them. Preformed Nd catalysts such as these produce polymers with relatively low cold flow, but the catalyst activity falls due to preforming so that the consumption of neodymium is significantly increased in part.

In addition, it is known that polydienes having improved properties, particularly reduced cold flow, can be produced by treating diene polymers with disulphur dichloride, sulphur dichloride, thionyl chloride, disulphur dibromide or thionyl bromide after polymerisation (see DE-AS 1 260 794). However, a disadvantage of the process for producing elastomeric rubber diene polymers with improved properties which is described in DE-AS 1 260 794 is that the diene polymers obtained have an unpleasant odour which has an undesirable effect when these polymers are processed.

The object of the present invention is therefore to provide a process which produces, by an energetically favourable route, diene rubbers with good rubber technology properties, reduced cold flow and no unpleasant intrinsic odour.

The present invention therefore relates to a process for producing diene rubbers polymerised by means of Nd catalysts and exhibiting reduced cold flow and low intrinsic odour, which is characterised in that diolefines are polymerised adiabatically at temperatures of −20° C. to 150° C. in the presence of inert organic solvents and in the presence of metallo-organic mixed catalysts based on neodymium carboxylates, the reaction mixture obtained in this manner is subsequently depressurised by reducing the pressure, and thereafter the reaction mixture is treated with disulphur dichloride, sulphur dichloride and/or thionyl chloride.

Dienes which can be used in the process according to the invention include butadiene, isoprene, pentadiene and 2,3-dimethylbutadiene, particularly butadiene and isoprene. The said dienes may be used both individually and in admixture, so that either homopolymers or copolymers of the said dienes are produced.

The polymerisation according to the invention is carried out in the presence of inert organic solvents. Examples of suitable inert organic solvents include: aromatic, aliphatic and/or cycloaliphatic hydrocarbons such as benzene, toluene, pentane, n-hexane, isohexane, heptane and/or cyclohexane.

The inert organic solvents are used in amounts from 200 to 900 parts by weight, based on 100 parts by weight of monomer. Amounts from 400 to 700 parts by weight are preferred.

It is important for the process according to the invention that the neodymium catalysts used are those neodymium catalysts which are described in the aforementioned European Patent Application 0 011 184. The neodymium catalysts to be used accordingly consist of:

A) a rare earth carboxylate of formula

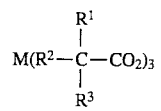

B) an aluminium alkyl; Al $R_3^4$ or $R_2^4$Al H, and

C) a Lewis acid; wherein in the above formulae

M represents a trivalent rare earth element with an atomic number of 57 to 71, particularly lanthanum, cerium, praseodymium or neodymium, most particularly neodymium, $R^1$, $R^2$ and $R^3$ represent identical or different alkyl radicals containing 1 to 10 carbon atoms, wherein the sum of all the C atoms in the substituents is 6 to 20, and $R^4$ represents an alkyl radical containing 1 to 10 carbon atoms.

In particular, catalysts are used in the process according to the invention which consist, for example, of A) a rare earth carboxylate, such as neodymium (versatate)$_3$, B) diisobutylaluminium hydride (DIBAH), and C) ethylaluminium sesquichloride (EASC).

In the polymerisation according to the invention, the metallo-organic mixed catalyst based on neodymium carboxylates according to the invention is used in amounts of 0.001 to 0.15 parts by weight, based on 100 parts by weight of monomer, particularly in amounts of 0.05 to 0.10 parts by weight.

The process according to the invention is carried out adiabatically, preferably at temperatures of −20° to 130° C. Pressures of about 1 to 7 bar are generated during the adiabatic mode of operation.

After the polymerisation has been carried out to completion (conversion≧98%) the reaction mixture obtained in this manner is depressurised by reducing the pressure. In this respect it may be depressurised to normal pressure; for technical reasons the pressure is decreased to 1.1 to 1.6 bar. During depressurisation, all the low-boiling components of the reaction mixture, such as unreacted dienes, volatilise.

The reaction mixture which remains after depressurisation, which is then practically free from low boiling fractions, is treated with disulphur dichloride, sulphur dichloride and/or thionyl chloride. Treatment is preferably effected with disulphur dichloride.

In general, 0.05 to 0.5 parts by weight, preferably 0.1 to 0.4 parts by weight, of sulphur chlorides are added to 100 parts by weight of diene rubber.

Treatment with sulphur chlorides is usually effected at temperatures of 20° to 150° C., preferably 40° to 60° C.

In the process according to the invention the aforementioned sulphur chlorides are stirred with the reaction mixture for about 5 to 30 minutes. Thereafter the reaction mixture is worked up by stripping off the solvent with steam in the usual manner and drying the moist crumb-like product, e.g. using a strainer screw and a downstream hot air drier.

By means of the process according to the invention it is possible in a particularly advantageous manner to add extender oils, e.g. aromatic extender oils, to the diene rubbers obtained, together with the sulphur chlorides. By this means the Mooney viscosity of the rubbers can be adjusted directly to the values of 30 to 50 which are suitable for processing. The corresponding amount of extender oil depends on the desired Mooney viscosity of the diene rubbers and can easily be determined by appropriate preliminary tests. Amounts of 20 to 50 phr are customary (phr=per hundred rubber).

It is particularly surprising that the process according to the invention is only successful when polymerisation is carried out adiabatically with subsequent depressurisation of the reaction mixture in the presence of the metallo-organic mixed catalysts described in European Patent Application 0 011 184.

Good results as regards cold flow are obtained when polymerisation is conducted with titanium catalysts, for example (see the comparison example). Products produced in this manner usually possess a strong intrinsic odour, however.

The process according to the invention has the following advantages:

The production of polydienes having a highly stereospecific cis-1,4 structure and good product properties using an adiabatic polymerisation process in which the reaction is conducted to obtain high conversions. Products with reduced cold flow and low intrinsic odour are obtained by the subsequent depressurisation and reaction with sulphur compounds.

EXAMPLES

In the following examples the cold flow is given in mg/min. It was determined at 50° C. by means of a modified outflow plastometer. This method substantially corresponds to conditions in practice.

Comparison Example 1

This examples corresponds to the prior art, polymerisation being performed using a titanium catalyst.

A cascade of 4 stirred polymerisation reactors was continuously fed with a stream of butadiene dissolved in benzene (12%). Temperature of the monomer solution: 4° C. Polymerisation was initiated by the addition of the following catalyst components:

1. triethylaluminium (TEA), 1.35 mmole phm (per hundred monomer)
2. titanium ethoxytrioxide (TEl), 0.15 mmole phm
3. titanium tetrachloride (TTC), 0.15 phm.

The solution was maintained at temperatures ≦50° C. by cooling. The reaction was stopped at about 95% conversion by the addition of 0.65 phm stearic acid and 0.27 phm Vulkanox BKF. The solution was heated to about 130° C. and fed into a depressurisation vessel, whereupon the unreacted butadiene and part of the solvent volatilised, so that the polymer concentration increased to 15%. The solution was treated with steam to remove the solvent. This resulted in a suspension of crumb-like product, which was worked up according to the prior art by dehydration and drying to obtain the final product.

The product had the following properties: ML 1+4/100° C.: 47. Cold flow 18 mg/min.

Comparison Example 2

This example corresponds to Comparison Example 1, except for the following:

Amount of catalyst added:

TEA: 1.5 mmole phm

TEI: 0.2 mmole phm

TTC: 0.2 mmole phm.

This gave a product with an ML of 37. After volatilisation of the residual monomer, this product was stirred for about 30 minutes with 0.085 phr $S_2Cl_2$. The product, which was subsequently worked in the usual manner, had the following properties:

ML–1+4/100° C.: 47. Cold flow 4 mg/min.

The cold flow was therefore significantly reduced, but the product now had a clear intrinsic odour which was perceived as unpleasant.

Example According to the Invention

A cascade of 3 reactors was continuously fed with a stream of butadiene dissolved in hexane (17%). Temperature of the monomer solution: 0° C. Polymerisation was initiated by the addition of the following catalyst components:

1. diisobutylaluminium hydride (DIBAH), 0.150 g phm
2. ethylaluminium sesquichloride (EASC), 0.03 g phm
3. neodymium versalate (NdV), 0.08 g phm.

Polymerisation proceeded adiabatically, so that after a conversion>99% had been achieved the temperature was about 110° C. The catalyst was deactivated by the addition of 0.5 phm stearic acid, and a solution of stabiliser (0.4 phm TNPP/0.2 phm Irganox 565) was added at the same time. The pressure, which was previously about 5 to 7 bar, was reduced to 1.5 bar in a depressurisation vessel, whereupon the low-boiling components and solvent volatilised. The concentration of the product in the solvent therafore increased to 18%. This solution was stirred for about 30 minutes with $S_2Cl_2$ and was subsequently worked up in the usual manner.

The product had the following properties:

ML 1+4/100° C., cold flow 10 mg/min.

No unpleasant intrinsic odour was present.

Comparison Example 3

This example was performed like the example according to the invention, with the exception that the polymer solution was not concentrated by depressurisation before reaction with $S_2Cl_2$. A product was obtained like that according to the invention, although a clear intrinsic odour was detectable.

We claim:

1. A process for producing diene rubbers by polymerization with Nd catalysts and which exhibit reduced cold flow and low intrinsic odor, comprising the steps of polymerizing diolefines adiabatically at temperatures of −20° C. to 150° C. in the presence of inert organic solvents and in the presence of metallo-organic mixed catalysts based on neodymium carboxylate, subsequently depressurizing the reaction mixture obtained in this manner by reducing the pressure, and thereafter treating the reaction mixture with disulphur dichloride, sulphur dichloride and/or thionyl chloride.

2. A process according to claim 1, wherein the diolefines are polymerised adiabatically at temperatures of −20° to 150° C. in the presence of inert aromatic, aliphatic and/or cycloaliphatic hydrocarbons and in the presence of 0.001 to 0.15 parts by weight, based on 100 parts by weight of monomer, of metallo-organic mixed catalysts based on neodymium carboxylate, the reaction mixture obtained in this manner is subsequently depressurised by reducing the pressure and thereafter the reaction mixture is treated with 0.05 to 0.5 parts by weight, based on 100 parts by weight of diene rubber, of disulphur dichloride, sulphur dichloride and/or thionyl chloride.

3. A process according to claim 1, wherein the reaction mixture is treated with disulphur dichloride.

* * * * *

UNITED STATES PATENT AND TRADEMARK OFFICE
CERTIFICATE OF CORRECTION

PATENT NO. : 5,567,784
DATED : October 22, 1996
INVENTOR(S) : Wieder, et al

It is certified that error appears in the above-indentified patent and that said Letters Patent is hereby corrected as shown below:

On the title page:

In the References Cited, U.S. PATENT DOCUMENTS section [56], the following U.S. Patent should be inserted:

4,533,711    8/1985  Takeuchi et al.......526/340.4

Also in the References Cited, FOREIGN PATENT DOCUMENTS section [56], the following foreign patent should be inserted:

DE 1260794    02/1968              Germany

Signed and Sealed this

Seventh Day of January, 1997

*Attest:*

BRUCE LEHMAN

*Attesting Officer*        *Commissioner of Patents and Trademarks*